US010409022B2

(12) United States Patent
Kaji et al.

(10) Patent No.: US 10,409,022 B2
(45) Date of Patent: Sep. 10, 2019

(54) METHOD AND DEVICE FOR PRODUCING OPTICAL FIBER UNIT

(71) Applicant: FUJIKURA LTD., Tokyo (JP)

(72) Inventors: Tomoaki Kaji, Sakura (JP); Masataka Mikami, Sakura (JP); Masayuki Ishioka, Sakura (JP); Ken Osato, Sakura (JP); Masayoshi Yamanaka, Sakura (JP); Naoki Okada, Sakura (JP)

(73) Assignee: FUJIKURA LTD., Koto-ku, Tokyo (JP)

( * ) Notice: Subject to any disclaimer, the term of this patent is extended or adjusted under 35 U.S.C. 154(b) by 346 days.

(21) Appl. No.: 15/305,247

(22) PCT Filed: Mar. 9, 2016

(86) PCT No.: PCT/JP2016/057327
§ 371 (c)(1),
(2) Date: Oct. 19, 2016

(87) PCT Pub. No.: WO2016/185767
PCT Pub. Date: Nov. 24, 2016

(65) Prior Publication Data
US 2017/0139168 A1 May 18, 2017

(30) Foreign Application Priority Data
May 21, 2015 (JP) .................. 2015-103426

(51) Int. Cl.
*G02B 6/44* (2006.01)
(52) U.S. Cl.
CPC ............... *G02B 6/449* (2013.01); *G02B 6/44* (2013.01); *G02B 6/441* (2013.01); *G02B 6/4403* (2013.01); *G02B 6/4413* (2013.01)

(58) Field of Classification Search
CPC ........ G02B 6/44; G02B 6/4405; G02B 6/4411
See application file for complete search history.

(56) References Cited

U.S. PATENT DOCUMENTS 4,820,366 A * 4/1989 Beever .................... B29C 70/52
156/166
8,878,805 B2 11/2014 Ujii et al.
(Continued)

FOREIGN PATENT DOCUMENTS

| CA | 2 922 660 A1 | 4/2015 |
| JP | 8-180744 A | 7/1996 |

(Continued)

OTHER PUBLICATIONS

Machine translation of JP2012-088454 (Year: 2012).*
(Continued)

*Primary Examiner* — Scott W Dodds
(74) *Attorney, Agent, or Firm* — Sughrue Mion, PLLC

(57) ABSTRACT

A method for producing an optical fiber unit by winding at least two bundling members on the outer circumference of an optical fiber bundle formed by bundling a plurality of optical fibers, including: feeding the optical fiber bundle from a fiber passage member; feeding the bundling members while forming intersection points between two of the bundling members on the outer circumference of the optical fiber bundle by feeding at least one of the bundling members from a bundling member passage part of a rotating member arranged to the outer circumference of the fiber passage member, while causing the rotating member to oscillate, with the feeding direction serving as the axis; and fusion-bonding the bundling members at their intersection points.

5 Claims, 11 Drawing Sheets

UPSTREAM ⟶ DOWNSTREAM
FEEDING DIRECTION

(56) References Cited

U.S. PATENT DOCUMENTS

2013/0038561 A1    2/2013   Ujii et al.
2016/0223769 A1    8/2016   Ito et al.

FOREIGN PATENT DOCUMENTS

| | | |
|---|---|---|
| JP | 11-337792 A | 12/1999 |
| JP | 11337792 A | 12/1999 |
| JP | 2011-196639 A | 10/2011 |
| JP | 2012-88454 A | 5/2012 |
| JP | 2012088454 A | 5/2012 |
| JP | 2012-212097 A | 11/2012 |
| JP | 2012212097 A | 11/2012 |
| JP | 2013-190641 A | 9/2013 |
| JP | 2013190641 A | 9/2013 |
| TW | 201527814 A | 7/2015 |
| WO | 2015/052951 A1 | 4/2015 |

OTHER PUBLICATIONS

Communication dated Mar. 22. 2018 from the European Patent Office in counterpart Application No. 16791295.5.
Communication dated Sep. 6, 2017, from the Canadian Patent Office in counterpart application No. 2,941,962.
Communication dated Jul. 12, 2017, from the Australian Patent Office in counterpart application No. 2016231659.
Japanese Office Action of 2015-103426, dated May 10, 2016.
International Preliminary Report on Patentability with translation of Written Opinion dated Nov. 30, 2017, in counterpart International Application No. PCT/JP2016/057327.
Communication dated Jan. 24, 2017, from the Intellectual Property Office of Taiwan in counterpart application No. 105108542.
Communication dated Oct. 15, 2018 from the State Intellectual Property Office of the P.R.C. in counterpart Chinese application No. 201680000790.0.

* cited by examiner

| RATIO(%) | EVALUATION OF FUSION-BOND |
|---|---|
| 95 | POOR |
| 100 | POOR |
| 110 | GOOD |
| 120 | GOOD |
| 130 | GOOD |
| 140 | GOOD |
| 150 | POOR |

| LENGTH OF STRAIGHT PART (mm) | EVALUATION OF FUSION-BOND |
|---|---|
| 1 | POOR |
| 3 | POOR |
| 5 | GOOD |
| 10 | GOOD |
| 15 | GOOD |
| 20 | GOOD |
| 25 | POOR |
| 30 | POOR |

METHOD AND DEVICE FOR PRODUCING OPTICAL FIBER UNIT

CROSS REFERENCE TO RELATED APPLICATIONS

This application is a National Stage of International Application No. PCT/JP2016/057327 filed Mar. 9, 2016, claiming priority based on Japanese Patent Application No. 2015-103426, filed May 21, 2015, the contents of all of which are incorporated herein by reference in their entirety.

TECHNICAL FIELD

The present invention relates to a method and a device for producing an optical fiber unit.

BACKGROUND ART

Techniques are known for forming an optical fiber cable including optical fiber units which are optical fiber aggregates formed by bundling a plurality of optical fibers. In such techniques, it is common to employ a method wherein a rough winding string (bundling member) is wound around the bundle of optical fibers to thereby suppress/prevent the bundle of optical fibers from falling apart while allowing the optical fiber units to be differentiated from one another by the colors of the bundling members.

In relation to such bundling members, Patent Literature 1 discloses a technique in which a plurality of bundling members are wound helically around a bundle of optical fibers and the bundling members are joined together, to thereby tie the bundle of optical fibers together. Patent Literature 2 (particularly FIG. 7 of Patent Literature 2) discloses a technique wherein the circumference of a bundle of a plurality of optical fibers is bundled with two bundling members by winding the two bundling members in an S-Z configuration, and the two bundling members are bonded and fixed together at sections where their winding directions are reversed.

CITATION LIST

Patent Literature

Patent Literature 1: JP 2011-169939A
Patent Literature 2: JP 2012-88454A

SUMMARY OF INVENTION

Technical Problem

In Patent Literature 1, a plurality of bundling members are wound helically on the circumference of a bundle of optical fibers, and the bundling members are joined together at their intersection points. Thus, in performing mid-span branching for extracting a specific optical fiber, the joined sections between the bundling members need to be disengaged. At that time, the bundling members need to be retrieved helically, which increases the time and effort for extracting the optical fiber. Also, at the time of retrieving the bundling members, there is a possibility that the optical fibers may break as a result of e.g. the worker's finger getting caught in the optical fibers.

In contrast, a configuration wherein two bundling members are wound in an S-Z configuration around the circumference of the bundle of optical fibers, as in Patent Literature 2, is advantageous in that workability at the time of extracting optical fibers is improved. It is, however, difficult to join bundling members together at sections where the bundling members' winding directions are reversed while increasing the speed (line speed) for feeding the optical fibers and the bundling members.

An objective of the invention is to facilitate the joining of bundling members at sections where their winding directions are reversed.

Solution to Problem

A primary aspect of the invention for achieving the aforementioned objective is a method for producing an optical fiber unit by winding at least two bundling members on the outer circumference of an optical fiber bundle formed by bundling a plurality of optical fibers, the method involving: feeding the optical fiber bundle in a feeding direction from a fiber passage member; feeding the bundling members while forming intersection points between two of the bundling members on the outer circumference of the optical fiber bundle by feeding at least one of the bundling members from a bundling member passage part of a rotating member that is arranged to the outer circumference of the fiber passage member, while causing the rotating member to oscillate, with the feeding direction serving as the axis; and fusion-bonding the bundling members at their intersection points by passing the optical fiber bundle and the bundling members through a heating unit that is arranged downstream from the fiber passage member and the rotating member in the feeding direction, and thus forming an optical fiber unit in which the winding direction, with respect to the optical fiber bundle, of the aforementioned at least one of the bundling members is reversed at a fusion-bonded point between the bundling members.

Other features of the invention are made clear by the following description and the drawings.

Advantageous Effects of Invention

With the present invention, it is possible to facilitate the joining of bundling members at sections where their winding directions are reversed.

DESCRIPTION OF EMBODIMENTS

Figure 1A:
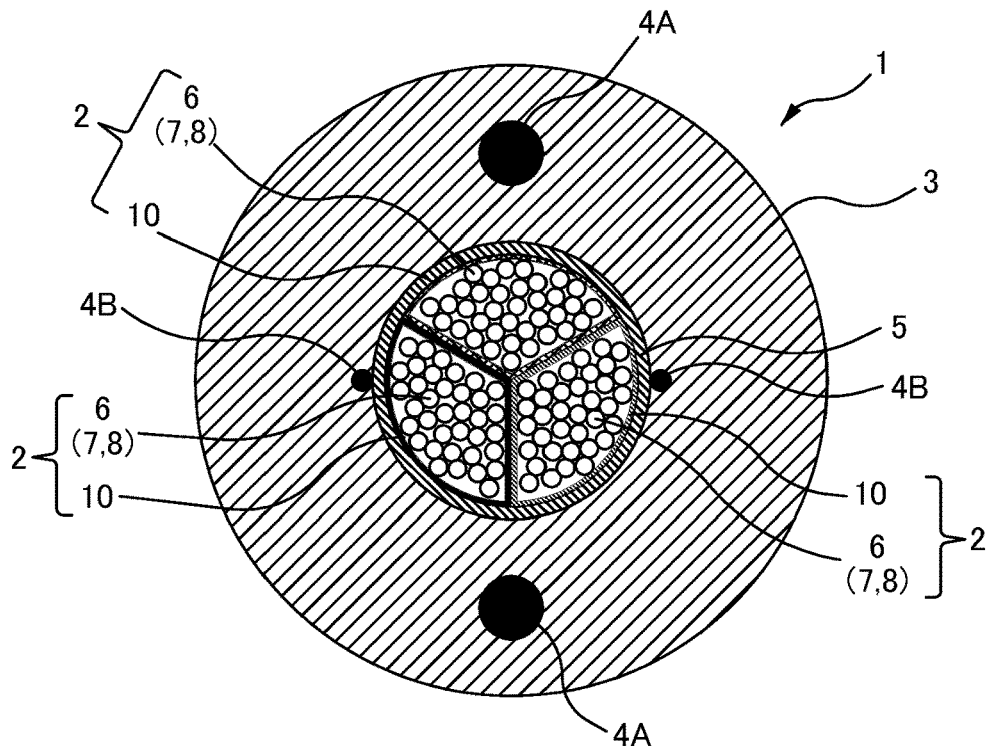
FIG. 1A is a cross-sectional view of an optical fiber cable 1 including optical fiber units 2.

At least the following matters are made clear from the following description and the drawings.

Disclosed is a method for producing an optical fiber unit by winding at least two bundling members on the outer circumference of an optical fiber bundle formed by bundling a plurality of optical fibers, the method involving: feeding the optical fiber bundle in a feeding direction from a fiber passage member; feeding the bundling members while forming intersection points between two of the bundling members on the outer circumference of the optical fiber bundle by feeding at least one of the bundling members from a bundling member passage part of a rotating member that is arranged to the outer circumference of the fiber passage member, while causing the rotating member to oscillate, with the feeding direction serving as an axis; and fusion-bonding the bundling members at their intersection points by passing the optical fiber bundle and the bundling members through a heating unit that is arranged downstream from the fiber passage member and the rotating member in the feeding direction, and thus forming an optical fiber unit in which the winding direction, with respect to the optical fiber bundle, of the aforementioned at least one of the bundling members is reversed at a fusion-bonded point between the bundling members. With this optical fiber unit production method, it is possible to facilitate the joining of bundling members at sections where their winding directions are reversed.

It is preferable that: the rotating member includes a first rotating member that is arranged to the outer circumference of the fiber passage member, and a second rotating member that is arranged to the outer circumference of the first rotating member; and the first rotating member and the second rotating member oscillate while rotating in opposite directions from one another. In this way, the movement range of each rotating member can be reduced.

It is preferable that: the first rotating member and the second rotating member are each constituted by a circular-cylindrical member; the first rotating member projects more toward the upstream side in the feeding direction than the second rotating member; and the first rotating member is rotated by driving a section, of the first rotating member, that projects more toward the upstream side in the feeding direction than the second rotating member. In this way, the first rotating member, which is located inside the second rotating member, can be driven.

It is preferable that the heating unit includes a tapered part whose inner diameter decreases toward the downstream side in the feeding direction, and a straight part provided downstream from the tapered part in the feeding direction. In this way, it is easy to heat the bundling members sufficiently, and the intersection point between two bundling members is fusion-bonded easily.

It is preferable that a cooling part is provided downstream from the straight part in the feeding direction. In this way, the fusion-bonded intersection point is less likely to disengage.

It is preferable that the rotating member oscillates, with the feeding direction serving as the axis, at an angle that is greater than a winding angle at which the bundling member is wound with respect to the optical fiber bundle in the optical fiber unit to be produced. In this way, it is possible to suppress/prevent the intersection point between bundling members from disappearing before the intersection point is fusion-bonded.

Also disclosed is a device for producing an optical fiber unit by winding at least two bundling members on the outer circumference of an optical fiber bundle formed by bundling a plurality of optical fibers, the device including: a fiber passage member that feeds the optical fiber bundle in a feeding direction; a rotating member that is arranged to the outer circumference of the fiber passage member and that has a bundling member passage part for feeding the bundling member, the rotating member being capable of oscillating with the feeding direction serving as an axis; and a heating unit that is arranged downstream from the fiber passage member and the rotating member in the feeding direction and through which the optical fiber bundle and the bundling members are passed, wherein: the bundling members are fed while forming intersection points between two of the bundling members on the outer circumference of the optical fiber bundle by feeding at least one of the bundling members from the bundling member passage part of the rotating member, while causing the rotating member to oscillate, with the feeding direction serving as the axis; and the bundling members are fusion-bonded at their intersection points in the heating unit, and thus an optical fiber unit is formed in which the winding direction, with respect to the optical fiber bundle, of the aforementioned at least one of the bundling members is reversed at a fusion-bonded point between the bundling members. With this optical fiber unit production device, it is possible to facilitate the joining of bundling members at sections where their winding directions are reversed.

First Embodiment

Structure of Optical Fiber Unit 2, Etc.:

FIG. 1A is a cross-sectional view of an optical fiber cable 1 including optical fiber units 2. The optical fiber cable 1 includes: a plurality of optical fiber units 2; and an outer sheath 3. Each optical fiber unit 2 has a structure wherein a plurality of optical fibers 8 are bundled by bundling members 10. The structure of the optical fiber unit 2 is described in detail further below. In this example, the optical fiber cable 1 includes three optical fiber units 2. The three optical fiber units 2 are covered by a wrapping tape 5, and the outer side thereof is covered by the outer sheath 3. Tension members 4A and rip cords 4B are embedded in the outer sheath 3.

Figure 1B:
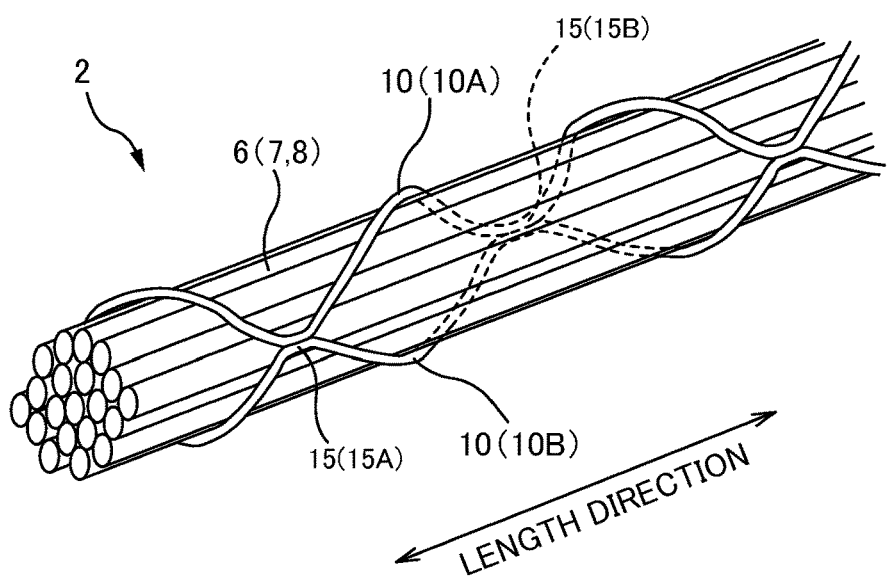
FIG. 1B is a perspective view of an optical fiber unit 2 according to a first embodiment.

FIG. 1B is a perspective view of the optical fiber unit 2 according to the first embodiment. The optical fiber unit 2 has a structure wherein a bundle of a plurality of optical fibers 8 (i.e., an optical fiber bundle 6) is bundled by bundling members 10. The bundling members 10 are wound on the outer circumference of the optical fiber bundle 6, and thus, the plurality of optical fibers 8 are bundled together and are prevented from falling apart. In this example, the optical fiber bundle 6 is constituted by bundling together a plurality of intermittently connected optical fiber ribbons 7.

Figure 2:
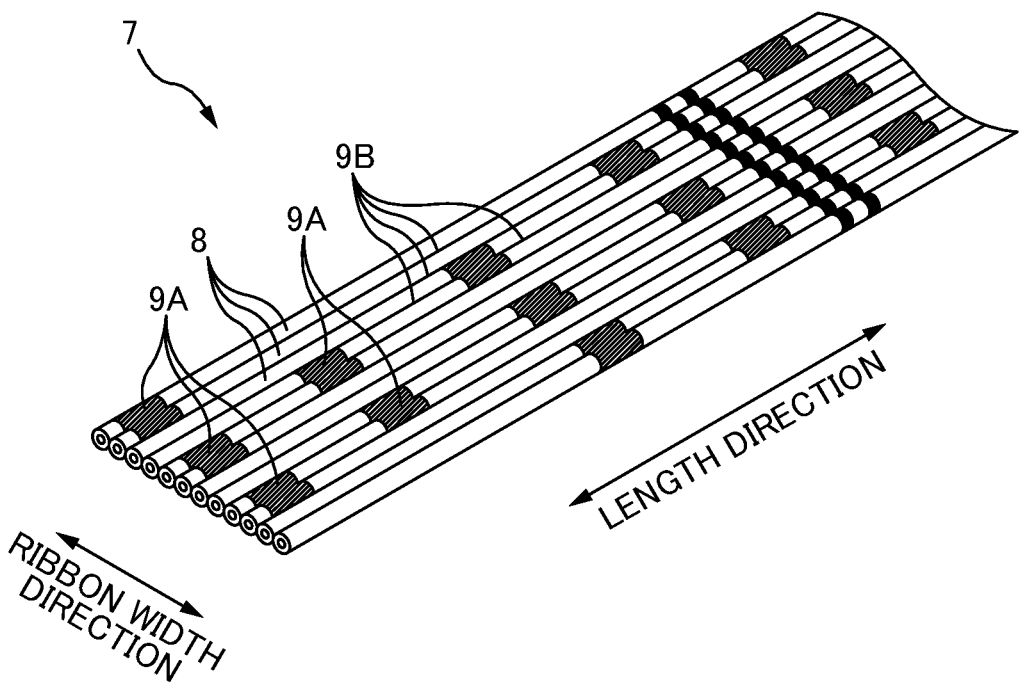
FIG. 2 is a diagram illustrating an intermittently connected optical fiber ribbon 7.

FIG. 2 is a diagram illustrating an example of an intermittently connected optical fiber ribbon 7.

The intermittently connected optical fiber ribbon 7 is an optical fiber ribbon 7 including a plurality of optical fibers 8 (twelve in this example) arranged side by side and connected intermittently. Two adjacent ones of the optical fibers 8 are connected by a connection part 9A. Between two adjacent optical fibers 8, a plurality of connection parts 9A are arranged intermittently in the length direction. The plurality of connection parts 9A of the intermittently connected optical fiber ribbon 7 are arranged intermittently and two-dimensionally in the length direction and the ribbon's width direction. Regions other than the connection parts 9A between the two adjacent optical fibers 8 constitute non-connected parts 9B. In the non-connected parts 9B, the two adjacent optical fibers 8 are not restrained. Thus, the intermittently connected optical fiber ribbon 7 can be rolled up into a cylindrical form (a bundle), or folded up, and the multitude of optical fibers 8 can be bundled with high density.

It should be noted that the intermittently connected optical fiber ribbon 7 constituting the optical fiber bundle 6 is not limited to the example illustrated in the figure. For example, the arrangement of the connection parts 9A may be changed. Also, the number of optical fibers 8 constituting the intermittently connected optical fiber ribbon 7 may be changed. Further, the optical fiber bundle 6 does not have to be constituted by an intermittently connected optical fiber ribbon 7, but may instead be constituted by, for example, bundling a plurality of separate optical fibers 8.

The bundling member 10 is a member that bundles the plurality of optical fibers 8 together. The bundling member 10 is a thread-form, cord-form, or tape-form member capable of tying the plurality of optical fibers 8 together. Each bundling member 10 is wound on the outer circumference of the optical fiber bundle 6. In the illustrated optical fiber unit 2, the optical fiber bundle 6 is bundled by two bundling members 10, but it is only necessary that there are at least two bundling members 10 in the optical fiber unit 2, and there may be two or more bundling members, as will be described further below.

A predetermined color is applied to each bundling member 10, and thus, the bundling member also functions as an identification member. The bundling members 10 in each optical fiber unit 2 have different colors, and can thus be differentiated from one another. In cases where each optical fiber unit 2 includes two bundling members 10 as illustrated in the figures, it is also possible to differentiate the optical fiber units 2 from one another by the combination of colors of the bundling members 10. Instead of coloring the bundling members 10, an identification mark may be printed on the surface of each bundling member 10.

Figure 3:
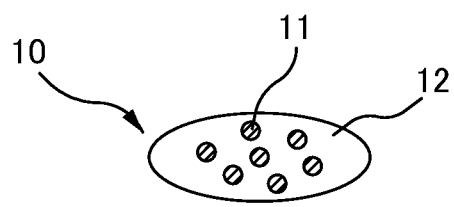
FIG. 3 is a diagram illustrating a cross-sectional structure of a bundling member 10.

FIG. 3 is a diagram illustrating a cross-sectional structure of the bundling member 10. The bundling member 10 includes core parts 11 and a cover part 12. The core parts 11 are members that extend along the length direction of the optical fiber unit 2, and the bundling member 10 includes a plurality of the core parts 11. The cover part 12 is a member that covers the outer circumference of each of the core parts 11, and that has a lower melting point than the melting point of the core parts 11. The two bundling members 10, which bundle the optical fiber unit 2, are thermally fusion-bonded at intersection points therebetween by the adhesiveness that arises by heating the cover part 12 at a temperature equal to or higher than the melting point. Preferably, the difference between the melting point of the core part 11 and the melting point of the cover part 12 is 20° C. or greater. The melting point of the core part 11 is preferably from 200 to 230° C., and the melting point of the cover part 12 is preferably from 150 to 180° C. It is preferable that: even when the cover part 12 is heated and molten, the cover part 12 either does not bond with the optical fibers 8 or has a weak adhesive force even if it bonds with the optical fibers; and the cover part does not cause degradation of the cover layer(s) of the optical fibers 8.

As for the core parts 11 and the cover part 12, it is possible to use, for example, a high melting point resin such as polypropylene (PP), polyamide (PA) or polyethylene terephthalate (PET), or a high melting point fiber such as polypropylene fiber, polyamide fiber (e.g. nylon (registered trademark)) or polyester fiber (e.g. PET fiber), or a high melting point tape or film made of e.g. PET or PP, covered by: a thermoplastic resin which is capable of reversibly repeating softening and hardening by heating and cooling, e.g. a low melting point resin such as polyethylene (PE), ethylene-vinyl acetate copolymer (EVA) or ethylene-ethyl acrylate copolymer (EEA); or a hot-melt adhesive which employs a thermoplastic resin or rubber as a base and which is capable of reversibly repeating softening and hardening by heating and cooling.

It should be noted that the bundling members 10 do not have to be a composite material of a high melting point material (core parts 11) and a low melting point material (cover part 12) as illustrated in FIG. 3, and instead may be constituted by a single material. For example, each bundling member may be constituted by either a high melting point material or a low melting point material; also, the two bundling members 10 may be constituted by different materials.

The width of the bundling member 10 is preferably from 1 mm to 2 mm inclusive. If the width of the bundling member 10 is narrower than 1 mm, the bundling member may break at the time of fusion-bonding. If the width of the bundling member 10 is wider than 2 mm, heat may not be transferred sufficiently, making fusion-bonding difficult. In the present embodiment, a bundling member 10 having a width of from 1.8 to 1.9 mm (thickness: 0.1 mm) is used.

Figure 4:
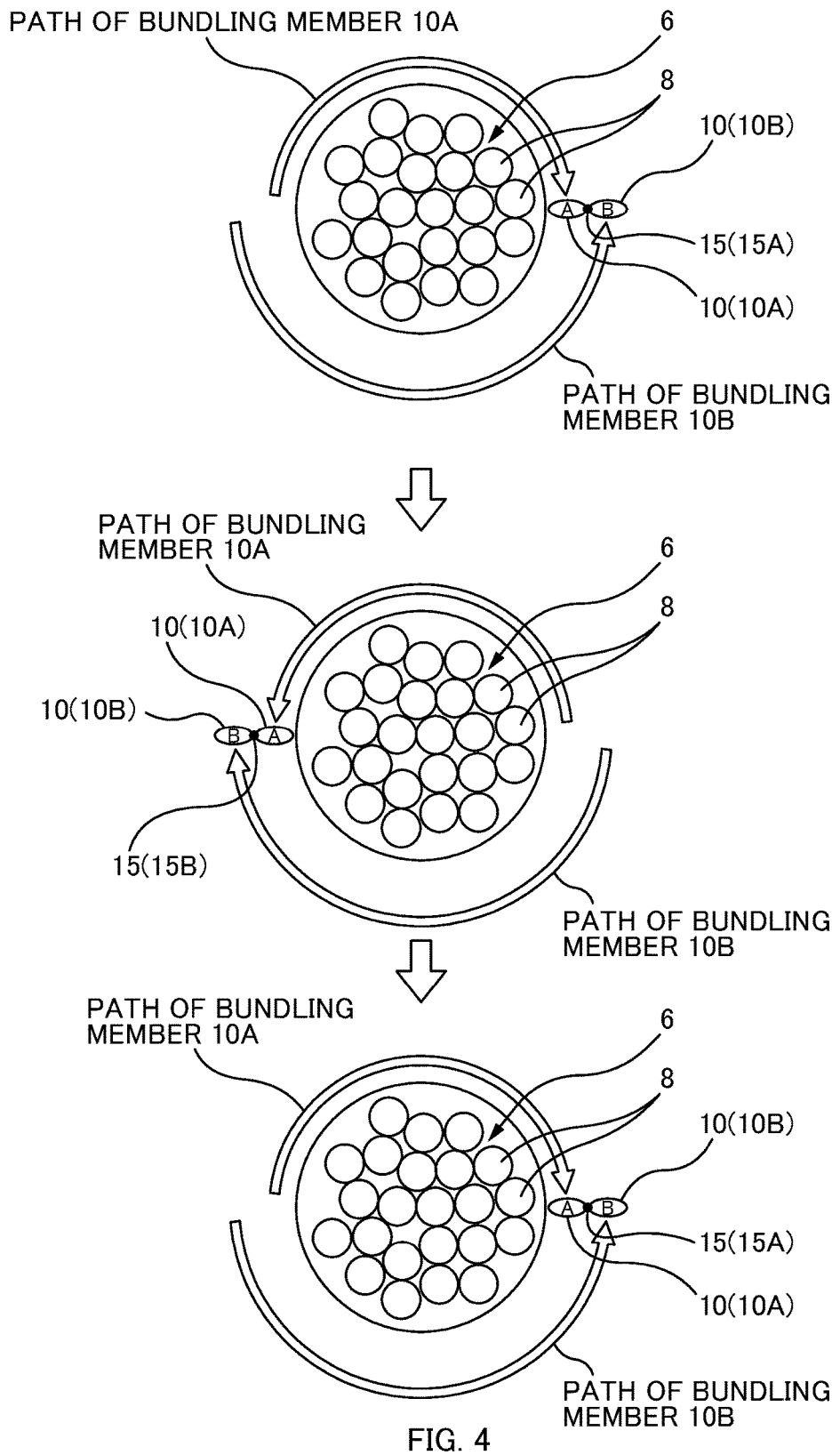
FIG. 4 is an explanatory diagram for illustrating how the bundling members 10 are wound.

FIG. 4 is an explanatory diagram for illustrating how the bundling members 10 are wound. How the bundling members 10 are wound around the optical fiber bundle 6 is described below also with reference to FIG. 1B.

Each bundling member 10 is wound on the outer circumference of the optical fiber bundle 6 and is arranged along the length direction of the optical fiber unit 2 such that the bundling member depicts an arc covering half the circumference of the bundle (i.e., 180 degrees). The two bundling members 10 are joined (fusion-bonded) at a joining point 15. Further, the respective winding directions, with respect to the optical fiber bundle 6, of the two bundling members 10 are reversed at the joining point 15 (fusion-bonded point). Stated differently, the bundling members 10 are wound around the optical fiber bundle 6 in an S-Z configuration.

When the optical fiber unit 2 is viewed from one side in the length direction, two joining points 15 are arranged so as to sandwich the optical fiber bundle 6. For the sake of explanation, in each of the diagrams in FIG. 4, the joining point 15 on the right-hand side is referred to as the first joining point 15A (cf. upper diagram of FIG. 4), and the joining point 15 on the left-hand side is referred to as the second joining point 15B (cf. center diagram of FIG. 4). Further, in each of the diagrams in FIG. 4, the upper bundling member 10 is referred to as the first bundling member 10A, and the lower bundling member 10 is referred to as the second bundling member 10B. The first bundling member 10A is wound clockwise on the outer circumference of the optical fiber bundle 6 (cf. upper diagram of FIG. 4), and is joined with the second bundling member 10B at the first joining point 15A (cf. upper diagram of FIG. 4); then, its winding direction is reversed, and the first bundling member is then wound counter-clockwise on the outer circumference of the optical fiber bundle 6 (cf. center diagram of FIG. 4), is joined with the second bundling member 10B at the second joining point 15B (cf. center diagram of FIG. 4), and then is again wound clockwise on the outer circumference of the optical fiber bundle 6 (cf. lower diagram of FIG. 4 (or upper diagram of FIG. 4)); and the aforementioned steps are repeated. The second bundling member 10B is wound counter-clockwise on the outer circumference of the optical fiber bundle 6 (cf. upper diagram of FIG. 4), and is joined with the first bundling member 10A at the first joining point 15A (cf. upper diagram of FIG. 4); then, its winding direction is reversed, and the second bundling member is then wound clockwise on the outer circumference of the optical fiber bundle 6 (cf. center diagram of FIG. 4), is joined with the first bundling member 10A at the second joining point 15B (cf. center diagram of FIG. 4), and then is again wound counter-clockwise on the outer circumference of the optical fiber bundle 6 (cf. lower diagram of FIG. 4 (or upper diagram of FIG. 4)); and the aforementioned steps are repeated. In this way, the two bundling members 10 are wound with respect to the optical fiber bundle 6 in an S-Z configuration, as illustrated in FIG. 1B.

It is preferable that the joining strength between the two bundling members 10 is of a degree at which the joining point 15 is not ruptured unexpectedly but can be separated easily with the worker's hands. In this way, upon e.g. mid-span branching, an optical fiber 8 can be extracted simply by disengaging the joining point 15, thus facilitating the extraction work. It should be noted that, if the bundling members 10 are wound helically in one direction on the outer circumference of the optical fiber bundle 6, it is necessary to helically retrieve and cut the bundling members 10, thus increasing the time and effort for extracting an optical fiber 8. Stated differently, if the bundling members 10 are wound helically in one direction, it takes time to unwind the helically-wound bundling members 10. In contrast, in the present embodiment, an optical fiber 8 can be extracted by simply disengaging the joining point 15 at the time of, for example, mid-span branching, thus facilitating the extraction work. Stated differently, in this optical fiber unit 2 wherein the bundling members 10 are wound in an S-Z configuration, a worker can easily separate the bundling members 10 by pulling them at the terminal, and thus, the time required for work can be shortened compared to cases where the bundling members 10 are wound helically in one direction. It is preferable that the force necessary for separating the joining point 15 between the bundling members 10 is smaller than the force required for cutting the bundling member 10, and so, the joining strength of the bundling members 10 is preferably less than or equal to the breaking strength of each bundling member 10.

It is preferable that the two bundling members 10 can be re-joined by applying heat with a heater or by applying an adhesive after the extraction of an optical fiber 8 in mid-span branching.

Figure 5:
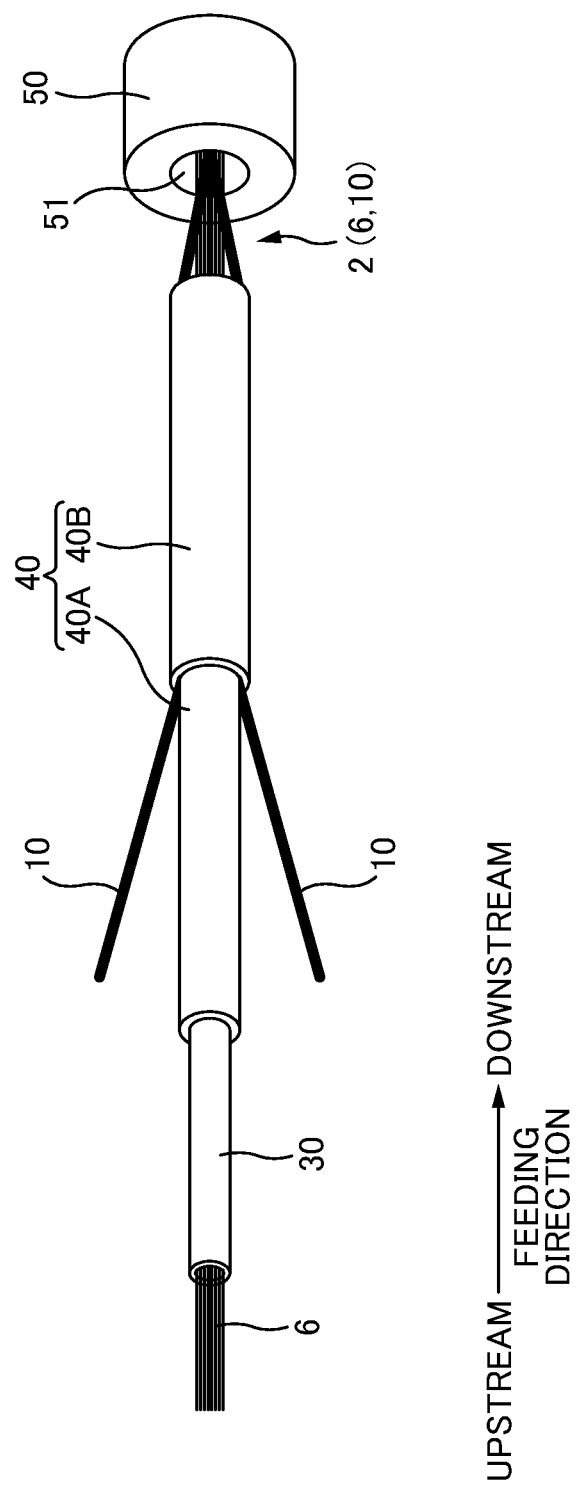
FIG. 5 is a diagram schematically illustrating a production device 20 for producing an optical fiber unit 2.

Method for Producing Optical Fiber Unit 2:

FIG. 5 is a diagram schematically illustrating a production device 20 for producing an optical fiber unit 2. In the description below, the direction in which the optical fibers 8 are fed is referred to as the "feeding direction". In the figure, the direction from left to right is the feeding direction.

The production device 20 is a device for producing an optical fiber unit 2 by winding bundling members 10 (in this example, two bundling members 10) on the outer circumference of an optical fiber bundle 6 formed by bundling a plurality of optical fibers 8. The production device 20 includes a fiber passage pipe 30, a rotating member 40 (first rotating member 40A and second rotating member 40B), and a heating unit 50.

The fiber passage pipe 30 is a fiber passage member for feeding the optical fiber bundle 6 in the feeding direction. The fiber passage pipe 30 is a circular-cylindrical (tubular) member. The optical fiber bundle 6 enters the fiber passage pipe 30 from an opening (inlet) on the upstream side in the feeding direction, passes through the fiber passage pipe 30, and is fed in the feeding direction from an opening (outlet) on the downstream side in the feeding direction. The heating unit 50 is arranged downstream from the fiber passage pipe 30. The optical fiber bundle 6 that has passed through the fiber passage pipe 30 is immediately fed into the heating unit 50.

The fiber passage pipe 30 extends more toward the upstream side in the feeding direction than the rotating member 40. By fixing this extended section, the fiber passage pipe 30 can be fixed.

The rotating member 40 is a rotating element that is arranged to the outer circumference of the fiber passage member and that feeds the bundling member 10 while oscillating, with the feeding direction serving as the axis. The rotating member 40 is provided with a bundling member passage part 41 (not illustrated in FIG. 5; first bundling member passage part 41A and second bundling member passage part 41B in FIGS. 6A and 6B). The bundling member 10 passes through the bundling member passage part 41 and is fed to the heating unit 50. When the rotating member 40 rotates, with the feeding direction serving as the axis, the bundling member passage part 41 moves so as to depict an arc on the outer circumference of the optical fiber bundle 6, with the feeding direction serving as the axis.

In this example, the rotating member 40 includes a first rotating member 40A and a second rotating member 40B. The first rotating member 40A is a circular-cylindrical member that is arranged to the outer circumference of the fiber passage pipe 30 (fiber passage member). The second rotating member 40B is a circular-cylindrical member that is arranged to the outer circumference of the first rotating member 40A. The first rotating member 40A and the second rotating member 40B oscillate while rotating in opposite directions from one another.

Figure 6A:
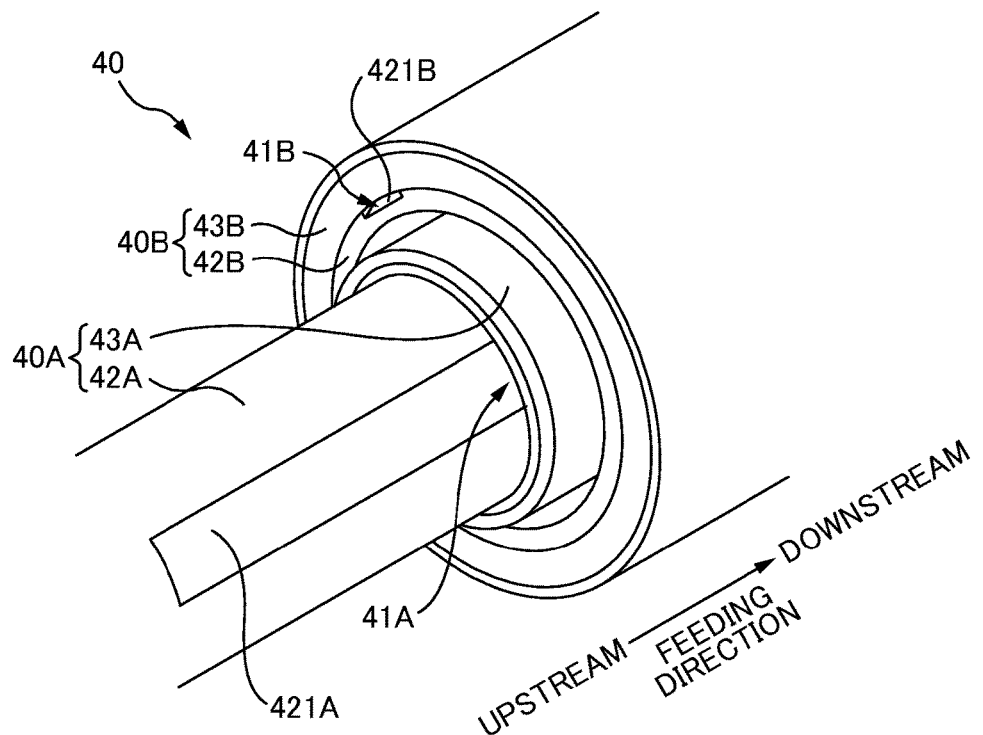
FIGS. 6A and 6B are perspective views of a first rotating member 40A and a second rotating member 40B.
Figure 6B:
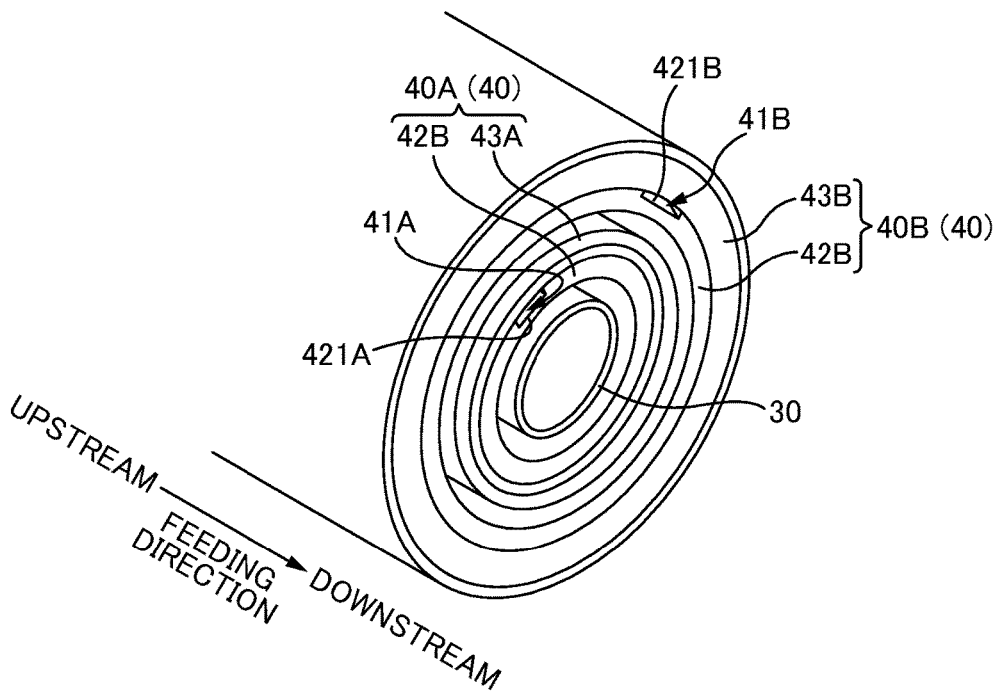

FIGS. 6A and 6B are perspective views of the first rotating member 40A and the second rotating member 40B. FIG. 6A is a perspective view in the vicinity of the inlet of the bundling member passage part 41 (the first bundling member passage part 41A and second bundling member passage part 41B) provided to the rotating member 40. FIG. 6B is a perspective view in the vicinity of the outlet of the bundling member passage part 41.

The first rotating member 40A is provided rotatably with respect to the fiber passage pipe 30 (fiber passage member). The first rotating member 40A has a first bundling member passage part 41A. When the first rotating member 40A rotates, with the feeding direction serving as the axis, the first bundling member passage part 41A moves so as to depict an arc on the outer circumference of the optical fiber bundle 6 (the optical fiber bundle 6 passing through the fiber passage pipe 30), with the feeding direction serving as the axis. The first rotating member 40A includes a first guide pipe 42A and a first retaining pipe 43A.

The first guide pipe 42A is a circular-cylindrical member, and the fiber passage pipe 30 is arranged therein. A first guide groove 421A is formed in the outer circumferential surface of the first guide pipe 42A. The first guide groove 421A is a groove along the length direction, and functions as a guide for guiding the bundling member 10 in the length direction. The first guide groove 421A is formed up to the downstream end of the first guide pipe 42A (cf. FIG. 6B).

The first retaining pipe 43A is a circular-cylindrical member arranged to the outer circumference of the first guide pipe 42A. The inner diameter of the first retaining pipe 43A is substantially the same as the outer diameter of the first guide pipe 42A, and the first guide groove 421A in the first guide pipe 42A is covered by the inner circumferential surface of the first retaining pipe 43A. The first guide pipe 42A and the first retaining pipe 43A are constructed integrally, and the first guide groove 421A forms a bundling member passage part 41 (bundling member passage hole) that runs through the interior of the circular-cylindrical first rotating member 40A in the length direction. Because the first retaining pipe 43A covers the first guide groove 421A, the bundling member 10 is prevented from escaping the first guide groove 421A even when the first rotating member 40A rotates (oscillates).

The first guide pipe 42A extends more toward the upstream side in the feeding direction than the first retaining pipe 43A (cf. FIG. 6A). Further, the upstream-side end of the first guide groove 421A is located more toward the upstream side than the first retaining pipe 43A. Thus, it is easier to feed the bundling member 10 into the first guide groove 421A between the first guide pipe 42A and the first retaining pipe 43A.

Further, the first guide pipe 42A extends more toward the upstream side in the feeding direction than the second rotating member 40B, and, by driving this extended section, the first rotating member 40A can be made to oscillate.

The second rotating member 40B is provided rotatably with respect to the first rotating member 40A. The second rotating member 40B has a second bundling member passage part 41B. When the second rotating member 40B rotates, with the feeding direction serving as the axis, the second bundling member passage part 41B moves so as to depict an arc on the outer circumference of the optical fiber bundle 6, with the feeding direction serving as the axis. The second rotating member 40B includes a second guide pipe 42B and a second retaining pipe 43B.

The second guide pipe 42B is a circular-cylindrical member, and the first rotating member 40A (first retaining pipe 43A) is arranged therein. It should be noted that the second guide pipe 42B and the first retaining pipe 43A are not restrained therebetween, and are rotatable with respect to one another. A second guide groove 421B is formed in the outer circumferential surface of the first guide pipe 42A. The second guide groove 421B is a groove along the length direction, and functions as a guide for guiding the bundling member 10 in the length direction. The second guide groove 421B is formed so as to extend from the upstream end to the downstream end of the second guide pipe 42B (cf. FIGS. 6A and 6B).

The second retaining pipe 43B is a circular-cylindrical member arranged to the outer circumference of the second guide pipe 42B. The inner diameter of the second retaining pipe 43B is substantially the same as the outer diameter of the second guide pipe 42B, and the second guide groove 421B in the second guide pipe 42B is covered by the inner circumferential surface of the second retaining pipe 43B. The second guide pipe 42B and the second retaining pipe 43B are constructed integrally, and the second guide groove 421B forms a bundling member passage part 41 (bundling member passage hole) that runs through the interior of the circular-cylindrical second rotating member 40B in the length direction. Because the second retaining pipe 43B covers the second guide groove 421B, the bundling member 10 is prevented from escaping the first guide groove 421A even when the second rotating member 40B rotates (oscillates).

Figure 7A:
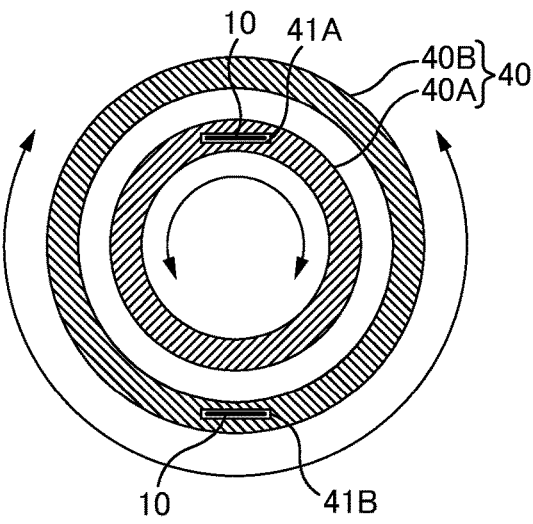
FIGS. 7A to 7E are diagrams illustrating the movement ranges of the first rotating member 40A and the second rotating member 40B.

FIGS. 7A to 7E are diagrams illustrating the respective movement ranges of the first rotating member 40A and the second rotating member 40B. It should be noted that FIGS. 7A to 7E do not illustrate the fiber passage pipe 30 arranged inside the rotating member 40 and the optical fiber bundle 6 passing through the fiber passage pipe 30. FIG. 7A illustrates the middle position of the first rotating member 40A and the second rotating member 40B. The "middle position" is the position in the middle of the movement range of the rotating member 40. At the middle position, the first bundling member passage part 41A and the second bundling member passage part 41B are located on opposite sides from one another with the rotation axis at the center therebetween. The first rotating member 40A and the second rotating member 40B each oscillate within the range between 120 degrees clockwise and 120 degrees counter-clockwise (i.e., within the range of ±120 degrees) with the middle position serving as the center. Herein, "oscillation" refers to a to-and-fro rotating motion with the feeding direction serving as the axis.

Figure 7B:
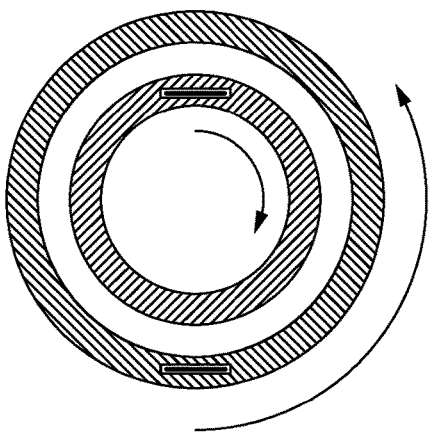
Figure 7D:
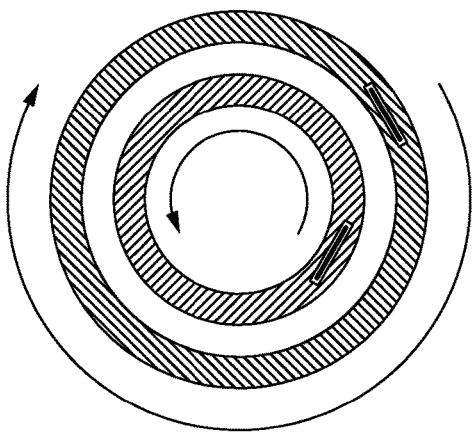
Figure 7C:
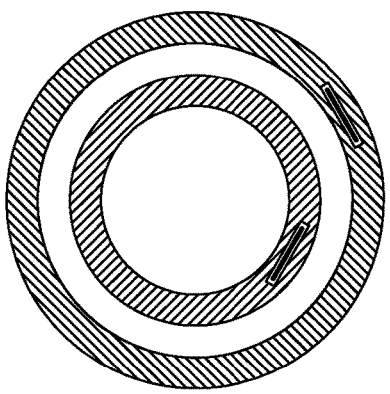

As illustrated in FIGS. 7B and 7C, when viewed from one side in the length direction, the first rotating member 40A rotates by 120 degrees clockwise from the middle position, and the second rotating member 40B rotates 120 degrees counter-clockwise from the middle position. The first bundling member passage part 41A and the second bundling member passage part 41B pass each other within a range from the state of FIG. 7B to the state of FIG. 7C. Thus, the bundling members 10 are fed in the feeding direction while an intersection point between the two bundling members 10 is formed on the outer circumference of the optical fiber bundle 6 at the rotating member 40's downstream end in the feeding direction.

Figure 7E:
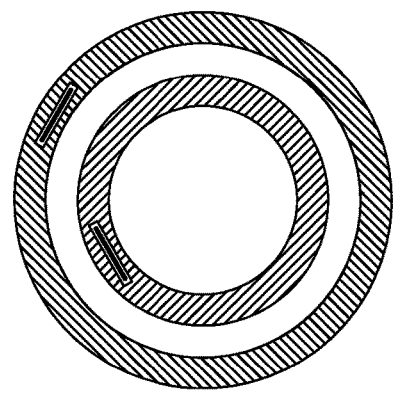

When the first rotating member 40A and the second rotating member 40B reach an end in their respective movement ranges, their rotating directions are reversed, and the first rotating member 40A and the second rotating member 40B rotate to the other end of their respective movement ranges. For example, after the first rotating member 40A rotates clockwise and the second rotating member 40B rotates counter-clockwise as illustrated in FIGS. 7B and 7C, the first rotating member 40A then rotates counter-clockwise and the second rotating member 40B rotates clockwise as illustrated in FIGS. 7D and 7E. The first bundling member passage part 41A and the second bundling member passage part 41B pass each other also within a range from the state of FIG. 7D to the state of FIG. 7E. Thus, an intersection point between the two bundling members 10 is formed on the outer circumference of the optical fiber bundle 6 at the rotating member 40's downstream end in the feeding direction.

The intersection point between the bundling members 10 that is formed within the range from the state of FIG. 7B to the state of FIG. 7C and the intersection point between the bundling members 10 that is formed within a range from the state of FIG. 7D to the state of FIG. 7E are located on opposite sides from one another across the optical fiber bundle 6. The intersection points formed on opposite sides across the optical fiber bundle 6 are fusion-bonded in the heating unit 50. In this way, two joining points 15 (first joining point 15A and second joining point 15B) are formed so as to sandwich the optical fiber bundle 6, as illustrated in FIG. 4.

Each bundling member 10 is wound so as to ultimately cover half the outer circumference of the optical fiber bundle 6 (i.e., 180 degrees). On the other hand, the rotating member 40 (first rotating member 40A and the second rotating member 40B) that feeds each bundling member 10 is rotated by an angle (240 degrees) that is greater than the winding angle (180 degrees) at which the bundling member 10 is ultimately wound. This configuration is employed to suppress/prevent the intersection point between the two bundling members 10 from disappearing during the period after the bundling members 10 are fed out from the rotating member 40 until the bundling members 10 are joined in the heating unit 50, even if the bundling members 10 unwind and the winding angle of each bundling member 10 decreases.

It should be noted that, as illustrated in FIG. 6B, the respective downstream ends, in the feeding direction, of the fiber passage pipe 30, the first rotating member 40A, and the second rotating member 40B are located substantially at the same position. The optical fiber bundle 6 is fed out from the fiber passage pipe 30's downstream end in the feeding direction, and the bundling members 10 are respectively fed out from the respective downstream ends, in the feeding direction, of the first rotating member 40A and the second rotating member 40B. When the rotating member 40 oscillates with the feeding direction serving as the axis, the bundling member passage part 41 moves to and fro, with the feeding direction serving as the axis, so as to depict an arc on the outer circumference of the optical fiber bundle 6. Thus, the bundling members 10 are fed into the heating unit 50 on the downstream side in the feeding direction while intersection points between the two bundling members 10 are formed on the outer circumference of the optical fiber bundle 6 at the rotating member 40's downstream end in the feeding direction.

The heating unit 50 is a member (heater) that heats the intersection points between the bundling members 10 and fusion-bonds the bundling members 10 at their intersection points. The heating unit 50 is arranged downstream from the fiber passage pipe 30 and the rotating member 40 in the feeding direction. The heating unit 50 has a unit passage part 51 (through hole) through which the optical fiber unit 2 (optical fiber bundle 6 and bundling members 10) is passed. When the optical fiber bundle 6 and the bundling members 10, which constitute the optical fiber unit 2, pass through the heating unit 50, there are intersection points between the two bundling members 10 formed on the outer circumference of the optical fiber bundle 6. These intersection points are fusion-bonded together by being heated by the heating unit 50, and thus, the two bundling members 10 are joined together.

Figures 8, 9:
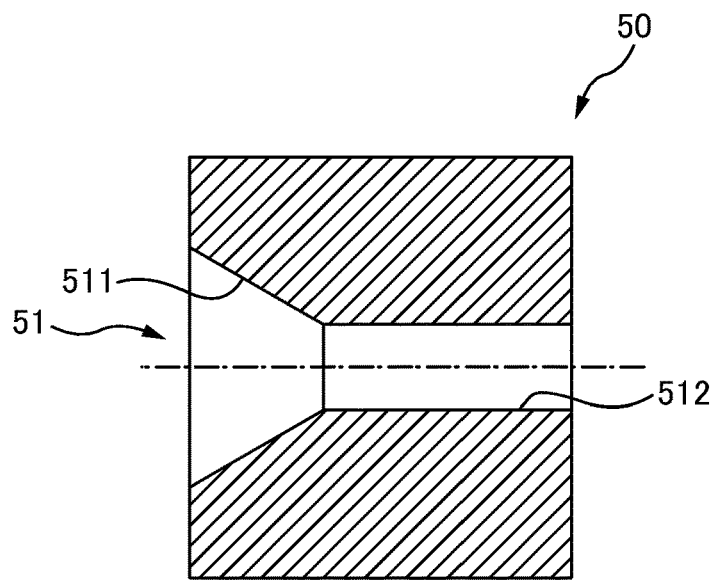
FIG. 8 is a diagram explaining the influence on fusion-bonding caused by the cross-sectional area of a unit passage part 51 (through hole) of a heating unit 50.
FIG. 9 is a cross-sectional view of the heating unit 50.

FIG. 8 is a diagram explaining the influence on fusion-bonding caused by the cross-sectional area of the unit passage part 51 (through hole) of the heating unit 50. Here, the quality of fusion-bonding was evaluated under the conditions where: the optical fiber bundle 6 was constituted by seventy-two fibers; the length of the unit passage part 51 (the later-described straight part 512) was 20 mm while the cross-sectional area of the unit passage part 51 was varied; and the heating temperature of the heating unit 50 was 240° C. The "ratio" in the figure refers to the ratio (S2/S1) of the cross-sectional area S2 of the unit passage part 51 (through hole) to the cross-sectional area S1 of the optical fiber unit 2. Note that the cross-sectional area S1 of the optical fiber unit 2 is the area calculated from the pitch diameter of the optical fiber unit 2 (with seventy-two fibers in this example). Fusion-bonding was evaluated as "Good" in cases where intersection points between the two bundling members 10 were fusion-bonded on the outer circumference of the optical fiber bundle 6, and fusion-bond was evaluated as "Poor" in cases where the intersection points were not fusion-bonded.

When the ratio was 100% or below, the intersection points between the two bundling members 10 were not fusion-bonded. The reason to this is considered as follows: when the ratio was 100% or below, the optical fiber unit 2 was too thick with respect to the diameter of the unit passage part 51 (through hole) and the clearance between the optical fiber unit 2 and the unit passage part 51 was too small; therefore, the bundling members 10 were stroked by the inner wall of the unit passage part 51 and the intersection points between the bundling members 10 became disengaged (i.e., the two bundling members 10 were brought out of contact), and thus, the intersection points between the two bundling members 10 were not fusion-bonded. It is also considered that, when the ratio was 150% or higher, the clearance between the optical fiber unit 2 and the unit passage part 51 was too large, and thus, the heat of the heating unit 50 was difficult to transfer to the bundling members 10 and the intersection points between the two bundling members 10 were not fusion-bonded. In contrast, when the ratio was from 110% to 140% inclusive, the intersection points between the two bundling members 10 were fusion-bonded on the outer circumference of the optical fiber bundle 6.

FIG. 9 is a cross-sectional view of the heating unit 50. The heating unit 50 includes a tapered part 511 and a straight part 512 as the unit passage part 51. The tapered part 511 is a hollow part whose inner diameter decreases toward the downstream side in the feeding direction. The straight part 512 is a hollow part that is provided downstream from the tapered part 511 in the feeding direction, and that has a constant inner diameter.

The optical fiber bundle 6 and the bundling members 10 fed into the heating unit 50 first enter the tapered part 511. The entrance of the tapered part 511 is wide, and thus, the tapered part 511 has a shape that allows the optical fiber bundle 6 and the bundling members 10 to easily enter the heating unit 50. As the optical fiber bundle 6 and the bundling members 10 pass through the tapered part 511, the clearance between the inner wall of the heating unit 50 and the optical fiber bundle 6 gradually narrows, and the bundling members 10 on the outer circumference of the optical fiber bundle 6 gradually approach the inner wall of the heating unit 50. When the optical fiber bundle 6 and the bundling members 10 reach the straight part 512, the bundling members 10 are close to, or in contact with, the inner wall of the heating unit 50 and are thus heated sufficiently. Thus, when the optical fiber bundle 6 and the bundling members 10 pass through the straight part 512, the intersection points between the two bundling members 10 are fusion-bonded.

Figures 10, 11:
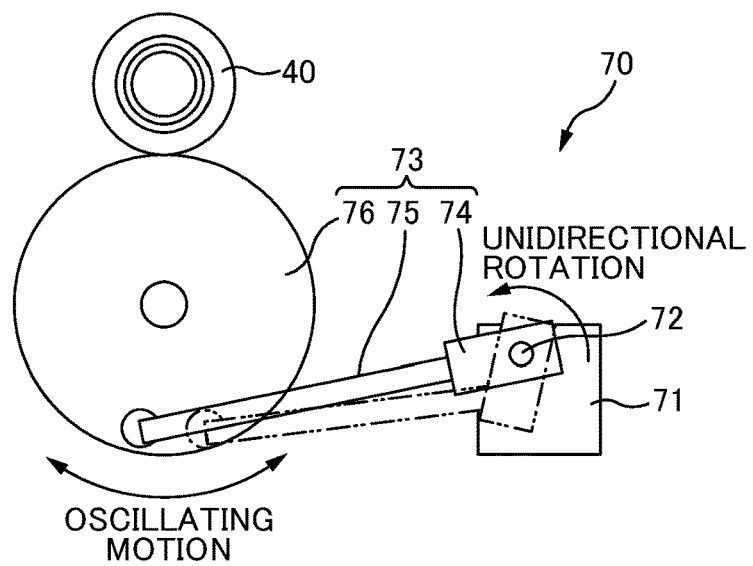
FIG. 10 is a diagram explaining the influence on fusion-bonding caused by the length of a straight part 512.
FIG. 11 is a diagram schematically illustrating a driving device 70 for a rotating member 40.

FIG. 10 is a diagram explaining the influence on fusion-bonding caused by the length of the straight part 512. Here, the quality of fusion-bonding was evaluated under the conditions where: the diameter of the unit passage part 51 (through hole) was 3.0 mm; the ratio, S2/S1, of the cross-sectional area S2 of the unit passage part 51 (through hole) to the cross-sectional area S1 of the optical fiber unit 2 was 120%; the length of the straight part 512 was varied within the range of from 1 mm to 30 mm; and the heating temperature of the heating unit 50 was 240° C.

It is considered that, when the length of the straight part 512 was 3 mm or less, the quantity of heat transferred to the bundling members 10 was insufficient, and thus, the intersection points between the two bundling members 10 were not fusion-bonded. It is considered that, when the length of the straight part 512 was 25 mm or greater, the resistance from the inner wall of the unit passage part 51 suffered by the bundling members 10 increased and the intersection points where the two bundling members 10 overlapped one another became disengaged, and thus, the intersection points between the two bundling members 10 were not fusion-bonded. In contrast, when the length of the straight part 512 was from 5 mm to 20 mm inclusive, the intersection points between the two bundling members 10 were fusion-bonded on the outer circumference of the optical fiber bundle 6.

The straight part 512 of the heating unit 50 may be extended toward the downstream side in the feeding direction, and the optical fiber unit 2 may be cooled in the extended part. Stated differently, a cooling part having the same inner diameter as the straight part 512 may be provided downstream from the straight part 512 in the feeding direction. By providing a cooling part, the fusion-bonded intersection points are less likely to disengage.

FIG. 11 is a diagram schematically illustrating a driving device 70 for the rotating member 40. The driving device 70 is a device that causes the rotating member 40 to oscillate. The driving device 70 includes a drive motor 71, a drive shaft 72, and an oscillation conversion mechanism 73. The drive motor 71 is a drive source that rotates the drive shaft 72 in a given direction. The oscillation conversion mechanism 73 is a mechanism that converts the unidirectional rotating motion of the drive shaft 72 into an oscillating rotation. The oscillation conversion mechanism 73 includes a crank 74, a connection link 75, and an oscillation plate 76. The crank 74 is provided to the drive shaft 72, and rotates in one direction with the drive shaft 72. The connection link 75 is provided between the crank 74 and the oscillation plate 76. The crank 74 and the connection link 75 are connected rotatably, and also the connection link 75 and the oscillation plate 76 are connected rotatably. The length of the crank 74 (the length from the drive shaft 72 to the connection point with the connection link 75) is shorter than the length from the axis of the oscillation plate 76 to the connection point between the oscillation plate 76 and the connection link 75. Thus, when the drive shaft 72 rotates in one direction, the oscillation plate 76 oscillates. By transmitting the oscillating motion of the oscillation plate 76 to the rotating member 40, the rotating member 40 is caused to oscillate.

Figure 12:
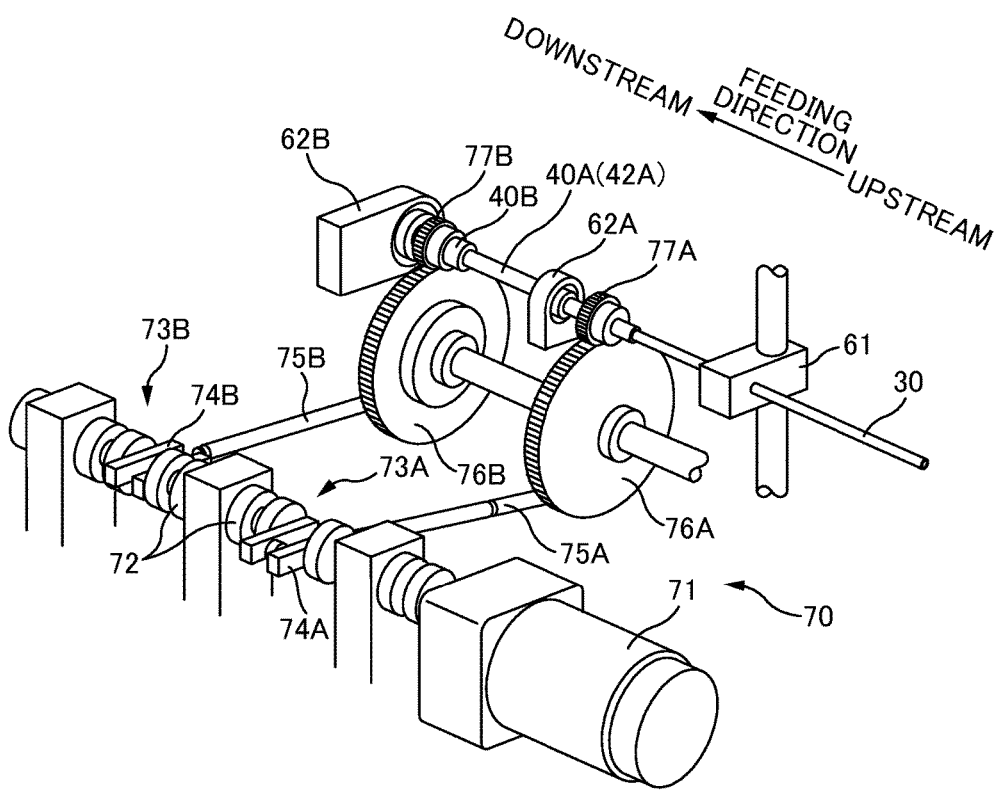
FIG. 12 is a perspective view of the driving device 70 and jigs for the rotating members 40.

FIG. 12 is a perspective view of the driving device 70 and jigs for the rotating members 40. It should be noted that, in FIG. 12, the heating unit 50 is not illustrated.

The jigs include a fixing part 61, a first bearing part 62A, and a second bearing part 62B.

The fixing part 61 is a member for fixing the fiber passage pipe 30. The fiber passage pipe 30 extends more toward the upstream side in the feeding direction than the rotating member 40, and the fixing part 61 fixes the extended section. The first bearing part 62A is a member that rotatably supports the first rotating member 40A. The first rotating member 40A extends more toward the upstream side in the feeding direction than the second rotating member 40B, and the first bearing part 62A fixes the extended section. The second bearing part 62B is a member that rotatably supports the second rotating member 40B. The second bearing part 62B rotatably supports the outer circumference of the second rotating member 40B (i.e., the second retaining pipe 43B). It is preferable to provide, inside the second rotating member 40B, a bearing between the first rotating member 40A and the second rotating member 40B, and it is also preferable to provide a bearing between the fiber passage pipe 30 and the first rotating member 40A.

The driving device 70 includes a first oscillation conversion mechanism 73A and a second oscillation conversion mechanism 73B. The first oscillation conversion mechanism 73A and the second oscillation conversion mechanism 73B each convert the rotating motion of the drive shaft 72, which is common thereto, into oscillating motion.

The first oscillation conversion mechanism 73A converts the unidirectional rotating motion of the drive shaft 72 into an oscillating motion, and causes the first rotating member 40A to oscillate. The first oscillation conversion mechanism 73A includes a first crank 74A, a first connection link 75A, and a first oscillation plate 76A. A gear wheel for transmitting force to the first rotating member 40A is formed on the first oscillation plate 76A. The first guide pipe 42A of the first rotating member 40A extends more toward the upstream side in the feeding direction than the second rotating member 40B, and a first transmission gear wheel 77A is provided on this extended section. The first transmission gear wheel 77A receives force from the first oscillation plate 76A, and the first rotating member 40A is caused to oscillate.

The second oscillation conversion mechanism 73B converts the unidirectional rotating motion of the drive shaft 72 into an oscillating motion, and causes the second rotating member 40B to oscillate. The second oscillation conversion mechanism 73B includes a second crank 74, a second connection link 75B, and a second oscillation plate 76B. A gear wheel for transmitting force to the second rotating member 40B is formed on the second oscillation plate 76B. A second transmission gear wheel 77B is provided on the outer circumference of the second rotating member 40B (i.e., the second retaining pipe 43B). The second transmission gear wheel 77B receives force from the second oscillation conversion mechanism 73B, and the second rotating member 40B is caused to oscillate.

The second crank 74 is formed such that its phase is reversed from that of the first crank 74A. In this way, even when the unidirectional rotating motion of the common drive shaft 72 is converted into an oscillating motion, the oscillating motion converted by the first oscillation conversion mechanism 73A and the oscillating motion converted by the second oscillation conversion mechanism 73B are in opposite directions from one another. Thus, even when the unidirectional rotating motion of the common drive shaft 72 is converted into an oscillating motion, the first rotating member 40A and the second rotating member 40B can be made to oscillate while rotating in opposite directions from one another.

According to the present embodiment, by causing the rotating member 40 to oscillate, the bundling members 10 can be fed while forming intersection points between the two bundling members 10 on the outer circumference of the optical fiber bundle 6, and the bundling members 10 can be fusion-bonded at their intersection points in the heating unit 50. Thus, it is possible to form an optical fiber unit 2 in which the winding directions, with respect to the optical fiber bundle 6, of the bundling members 10 are reversed at fusion-bonded points between the bundling members 10, as illustrated in FIG. 1B. Further, in the present embodiment, because the rotating member 40 and the heating unit 50 are arranged separately in the feeding direction, the formation of intersection points between the two bundling members and the fusion-bonding of the intersection points can be performed separately. Thus, the line speed can be increased. If the intersection points are joined at the same place as where the intersection points between the two bundling members 10 are formed, the production device will become complicated, and also, the operation of forming the intersection point will interfere with the operation of joining the intersection points, thus making it difficult to increase line speed.

Further, according to the present embodiment, the first rotating member 40A and the second rotating member 40B oscillate while rotating in opposite directions from one another (cf. FIG. 7A). Thus, the movement range (angle of rotation) of each of the first rotating member 40A and the second rotating member 40B can be reduced to approximately half. As a result, the tension applied to each bundling member 10 during rotation of the rotating member 40 can be reduced, and thus, the bundling members 10 are less likely to get unwound and the intersection points between the two bundling members 10 are less likely to disappear during the period after the bundling members 10 are fed out from the rotating member 40 until the bundling members 10 are joined in the heating unit 50.

Second Embodiment

Figure 13A:
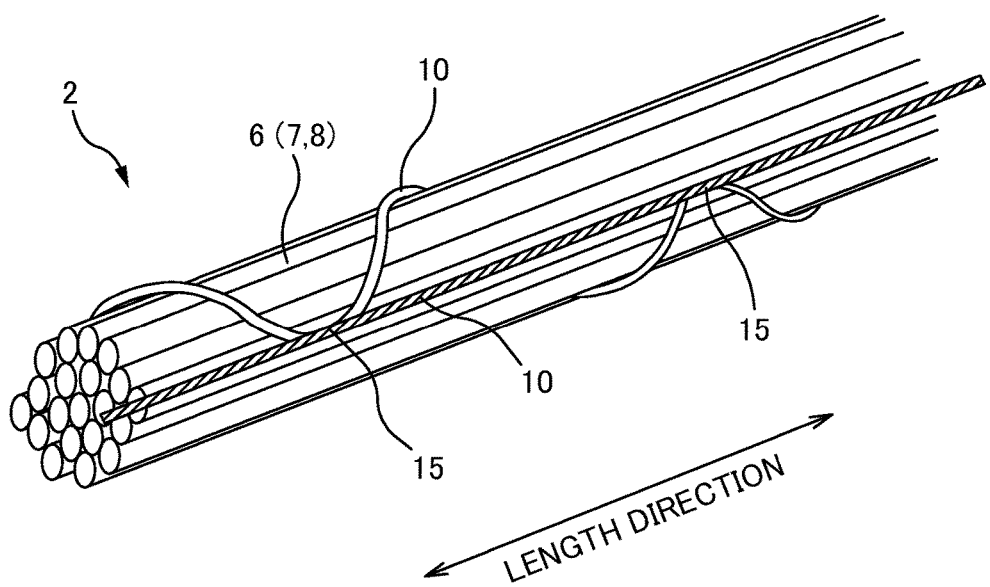
FIG. 13A is a perspective view of an optical fiber unit 2 according to a second embodiment.

FIG. 13A is a perspective view of an optical fiber unit 2 according to a second embodiment. In the foregoing first embodiment, two bundling members 10 are wound in an S-Z configuration (cf. FIG. 1B). In the second embodiment, one of the two bundling members 10 is wound in an S-Z configuration, but the other bundling member 10 is not wound in an S-Z configuration and is instead placed longitudinally along the length direction of the optical fiber bundle 6. It should be noted that, also in the second embodiment, the winding direction, with respect to the optical fiber bundle 6, of the aforementioned S-Z-wound bundling member 10 is reversed at the fusion-bonded point with the other bundling member 10.

Figure 13B:
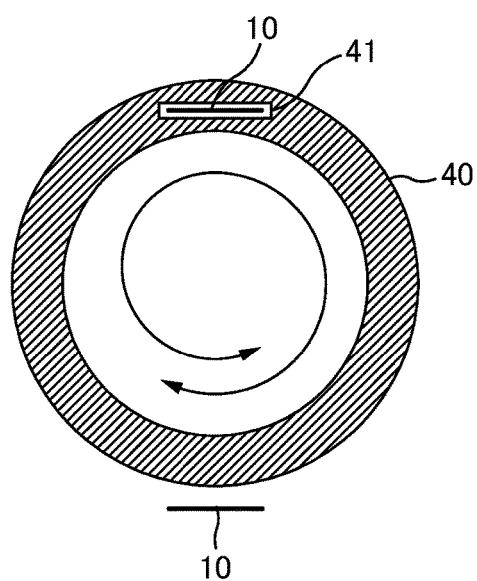
FIG. 13B is a diagram illustrating a rotating member 40 according to the second embodiment.

FIG. 13B is a diagram illustrating a rotating member 40 according to the second embodiment. The production device 20 of the second embodiment includes a fiber passage pipe 30 (not illustrated in FIG. 13B), a rotating member 40, and a heating unit 50 (not illustrated in FIG. 13B). The fiber passage pipe 30 (not illustrated) is arranged inside the rotating member 40, as in the first embodiment. Also, the heating unit 50 (not illustrated) is arranged downstream from the fiber passage pipe 30 and the rotating member 40 in the feeding direction, as in the first embodiment.

As illustrated in FIG. 13B, a bundling member passage part 41 is provided in the rotating member 40. One of the bundling members 10 (the bundling member 10 wound in an S-Z configuration around the optical fiber bundle 6) passes through the bundling member passage part 41 and is fed to the heating unit 50. When the rotating member 40 rotates, with the feeding direction serving as the axis, the bundling member passage part 41 moves so as to depict an arc on the outer circumference of the optical fiber bundle 6, with the feeding direction serving as the axis, and along therewith, the bundling member 10 also moves so as to depict an arc on the outer circumference of the optical fiber bundle 6, with the feeding direction serving as the axis.

In the second embodiment, the other bundling member 10 (the bundling member 10 placed longitudinally along the optical fiber bundle 6) is fed directly to the heating unit 50, without passing through the rotating member 40. Thus, the other bundling member 10 is not affected by the rotation of the rotating member 40.

At the middle position, the bundling member passage part 41 (one bundling member 10) and the other bundling member 10 are located on opposite sides from one another with the rotation axis at the center therebetween. The rotating member 40 oscillates within the range between 210 degrees clockwise and 210 degrees counter-clockwise (i.e., within the range of ±210 degrees) with the middle position serving as the center. It should be noted that, in order to prevent/suppress the intersection points between the two bundling members 10 from disappearing before they are fusion-bonded, also in the second embodiment, the rotating member 40 that feeds the bundling member 10 is rotated by an angle (420 degrees) that is greater than the winding angle (360 degrees) at which the bundling member 10 is ultimately wound.

Also in the second embodiment, the two bundling members 10 pass each other when the rotating member 40 oscillates. Thus, an intersection point between the two bundling members 10 is formed on the outer circumference of the optical fiber bundle 6 at the rotating member 40's downstream end in the feeding direction. Further, the bundling members 10 are fed into the heating unit 50 on the downstream side in the feeding direction while intersection points between the two bundling members 10 are formed on the outer circumference of the optical fiber bundle 6 at the rotating member 40's downstream end in the feeding direction. These intersection points are fusion-bonded in the heating unit 50, and thereby the two bundling members 10 are joined together.

Even in cases where only one bundling member 10 is fed from the bundling member passage part 41 of the rotating member 40 as in the aforementioned second embodiment, by causing the rotating member 40 to oscillate, the bundling members 10 can be fed while forming intersection points between the two bundling members 10 on the outer circumference of the optical fiber bundle 6, and the bundling members 10 can be fusion-bonded at their intersection points in the heating unit 50. Thus, it is possible to form an optical fiber unit 2 in which the winding direction, with respect to the optical fiber bundle 6, of the bundling member 10 is reversed at fusion-bonded points between the bundling members 10, as illustrated in FIG. 13A. It should be noted, however, that, because the movement range of the rotating member 40 is greater compared to the first embodiment, the winding angle of the bundling member 10 is prone to decrease during the period after the bundling member 10 is fed out from the rotating member 40 until the bundling members 10 are joined in the heating unit 50.

In the second embodiment, the bundling member 10 placed longitudinally along the optical fiber bundle 6 is fed from outside the rotating member 40. In this way, when the two bundling members 10 are fed into the heating unit 50, the longitudinally-placed bundling member 10 retains the S-Z-wound bundling member 10 from above, and thus, the bundling member 10 is less prone to unwind and the intersection points between the two bundling members 10 are less prone to disappear. It should be noted, however, that the longitudinally-placed bundling member 10 may be fed from inside the rotating member 40.

Third Embodiment

Figure 14A:
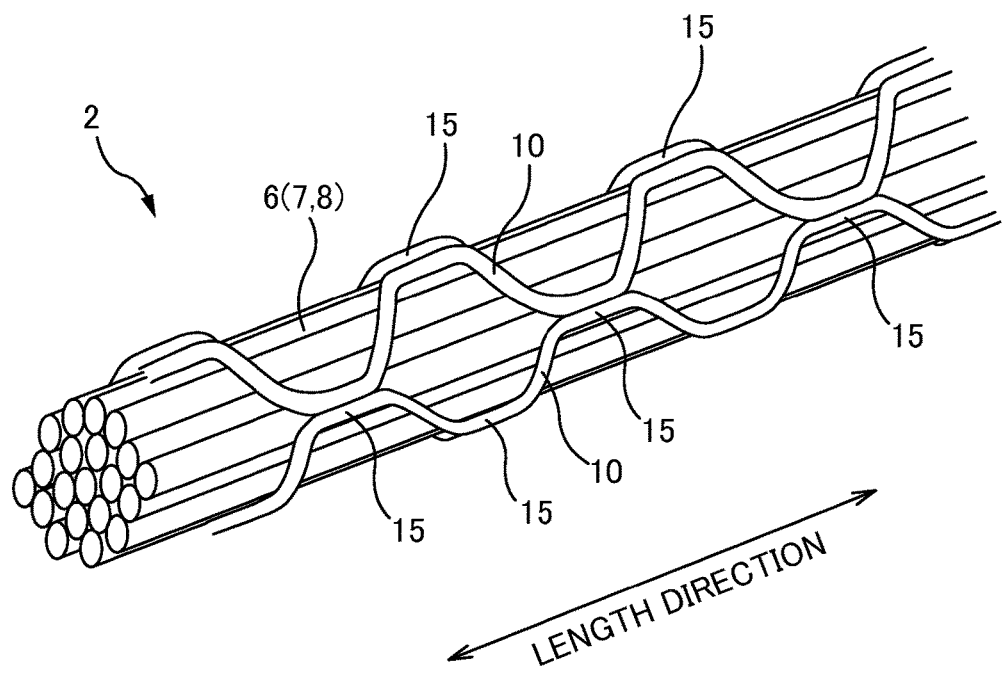
FIG. 14A is a perspective view of an optical fiber unit 2 according to a third embodiment.

FIG. 14A is a perspective view of an optical fiber unit 2 according to a third embodiment. In the foregoing first and second embodiments, the optical fiber unit 2 includes two bundling members 10 (cf. FIGS. 1B and 13A). In the third embodiment, the optical fiber unit 2 includes four bundling members 10. It should be noted that, also in the third embodiment, the winding direction, with respect to the optical fiber bundle 6, of each S-Z-wound bundling member 10 is reversed at the fusion-bonded point with another bundling member 10.

Figure 14B:
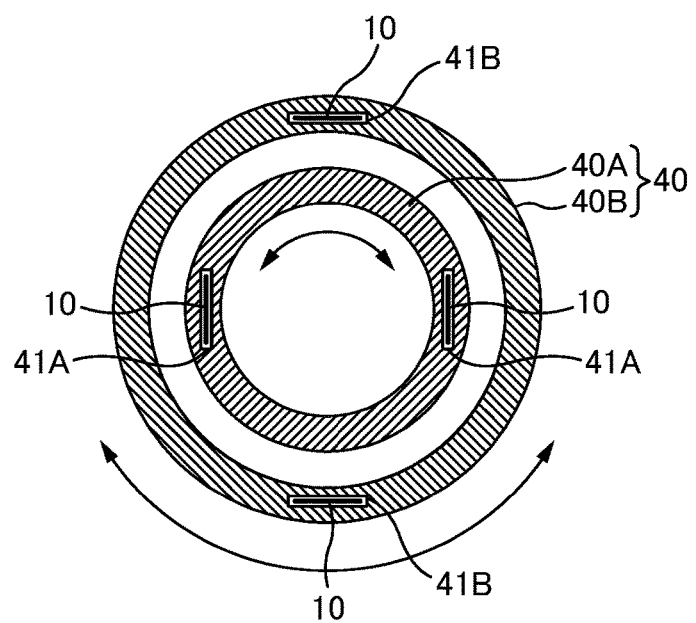
FIG. 14B is a diagram illustrating rotating members 40 according to the third embodiment.

FIG. 14B is a diagram illustrating a rotating member 40 according to the third embodiment. The production device 20 of the third embodiment also includes a fiber passage pipe 30 (not illustrated in FIG. 14B), a rotating member 40, and a heating unit 50 (not illustrated in FIG. 14B). The fiber passage pipe 30 (not illustrated) is arranged inside the rotating member 40, as in the first embodiment. Also, the heating unit 50 (not illustrated) is arranged downstream from the fiber passage pipe 30 and the rotating member 40 in the feeding direction, as in the first embodiment. Further, as in the first embodiment, the rotating member 40 includes a first rotating member 40A and a second rotating member 40B. The first rotating member 40A and the second rotating member 40B oscillate while rotating in opposite directions from one another.

In the third embodiment, the first rotating member 40A includes two first bundling member passage parts 41A. The two first bundling member passage parts 41A are located on opposite sides from one another with the rotation axis at the center therebetween. The second rotating member 40B also includes two second bundling member passage parts 41B. The two second bundling member passage parts 41B are also located on opposite sides from one another with the rotation axis at the center therebetween.

At the middle position, the four bundling member passage parts 41 (the two first bundling member passage parts 41A and the two second bundling member passage parts 41B) are arranged evenly with the rotation axis at the center. The first rotating member 40A and the second rotating member 40B each oscillate within the range between 60 degrees clockwise and 60 degrees counter-clockwise (i.e., within the range of ±60 degrees) with the middle position serving as the center. It should be noted that, in order to prevent/suppress the intersection points between the bundling members 10 from disappearing before they are fusion-bonded, also in the third embodiment, the rotating member 40 (first rotating member 40A and second rotating member 40B) that feeds each bundling member 10 is rotated by an angle (120 degrees) that is greater than the winding angle (90 degrees) at which the bundling member 10 is ultimately wound.

Focusing on each first bundling member passage part 41A, when the first rotating member 40A rotates clockwise, the first bundling member passage part 41A passes one of the second bundling member passage parts 41B of the second rotating member 40B, and when the first rotating member 40A rotates counter-clockwise, it passes the other second bundling member passage part 41B of the second rotating member 40B. Focusing on each second bundling member passage part 41B, when the second rotating member 40B rotates clockwise, the second bundling member passage part 41B passes one of the first bundling member passage parts 41A of the first rotating member 40A, and when the second rotating member 40B rotates counter-clockwise, it passes the other first bundling member passage part 41A of the first rotating member 40A. Thus, an intersection point between two bundling members 10, which respectively pass through the first bundling member passage part 41A and the second bundling member passage part 41B, is formed on the outer circumference of the optical fiber bundle 6 at the rotating member 40's downstream end in the feeding direction. Further, the bundling members 10 are fed into the heating unit 50 on the downstream side in the feeding direction while intersection points between the bundling members 10 are formed on the outer circumference of the optical fiber bundle 6 at the rotating member 40's downstream end in the feeding direction. These intersection points are fusion-bonded in the heating unit 50, and thereby the bundling members 10 are joined together.

Even in cases where four or more bundling members 10 are fed from respective bundling member passage parts 41 of the rotating member 40 as in the aforementioned third embodiment, by causing the rotating member 40 to oscillate, the bundling members 10 can be fed while forming intersection points between the two bundling members 10 on the outer circumference of the optical fiber bundle 6, and the bundling members 10 can be fusion-bonded at their intersection points in the heating unit 50. Thus, it is possible to form an optical fiber unit 2 in which the winding directions, with respect to the optical fiber bundle 6, of the bundling members 10 are reversed at fusion-bonded points between the bundling members 10, as illustrated in FIG. 14A. In the third embodiment, the movement range of each rotating member 40 is smaller compared to the other embodiments, and thus, the intersection points between the bundling members 10 are less prone to disappear before they are fusion-bonded.

In the third embodiment, the first rotating member 40A and the second rotating member 40B each have two bundling member passage parts 41 formed therein, and thus, four bundling members 10 can be fed with the two rotating members 40 (first rotating member 40A and second rotating member 40B). Thus, the number of rotating members 40 made to oscillate can be reduced. It should be noted, however, that each rotating member 40 may be provided with one bundling member passage part 41, and four bundling members 10 may be fed by four rotating members 40.

Other Embodiments

The foregoing embodiments are for facilitating the understanding of the present invention, and are not to be construed as limiting the present invention. The present invention may be modified and/or improved without departing from the gist thereof, and it goes without saying that the present invention encompasses any equivalents thereof.

Number of Bundling Members 10:

The foregoing embodiments describe examples in which there are two or four bundling members 10 wound on the optical fiber bundle 6. However, the number of bundling members 10 to be provided in a single optical fiber unit 2 is not limited thereto. For example, there may be three, or five or more, bundling members.

Rotating Member 40:

The aforementioned first rotating member 40A is constituted by a first guide pipe 42A and a first retaining pipe 43A. The configuration of the first rotating member 40A, however, is not limited thereto, and other configurations may be employed. For example, the first rotating member 40A may be constituted only by the first guide pipe 42A, and the first guide groove 421A of the first guide pipe 42A may be covered by the inner circumferential surface of the second rotating member 40B to form the bundling member passage part of the first rotating member 40A. Similarly, the second rotating member 40B is not limited to the aforementioned configuration.

Further, although the aforementioned rotating member is constituted by a circular-cylindrical member (pipe), the rotating member may, for example, be constituted by a ring-shaped member.

REFERENCE SIGNS LIST

1: Optical fiber cable;
2: Optical fiber unit;
3: Outer sheath;
4A: Tension member;
4B: Rip cord;
5: Wrapping tape;
6: Optical fiber bundle;
7: Intermittently connected optical fiber ribbon;
8: Optical fiber;
9A: Connection part;
9B: Non-connected part;
10: Bundling member (10A: First bundling member; 10B: Second bundling member);
11: Core part;
12: Cover part;
15: Joining point (15A: First joining point; 15B: Second joining point);
20: Production device;
30: Fiber passage pipe;
40: Rotating member (40A: First rotating member; 40B: Second rotating member);
41: Bundling member passage part (41A: First bundling member passage part; 41B: Second bundling member passage part);
42A: First guide pipe;
421A: First guide groove;
42B: Second guide pipe;
421B: Second guide groove;
43A: First retaining pipe;
43B: Second retaining pipe;
50: Heating unit;
51: Unit passage part;
511: Tapered part;
512: Straight part;
61: Fixing part;
62A: First bearing part;
62B: Second bearing part;
70: Driving device;
71: Drive motor;
72: Drive shaft;
73: Oscillation conversion mechanism (73A: First oscillation conversion mechanism; 73B: Second oscillation conversion mechanism);
74: Crank (74A: First crank; 74B: Second crank);
75: Connection link (75A: First connection link; 75B: Second connection link);
76: Oscillation plate (76A: First oscillation plate; 76B: Second oscillation plate);
77A: First transmission gear wheel;
77B: Second transmission gear wheel.

The invention claimed is:

1. A method for producing an optical fiber unit by winding at least two bundling members on an outer circumference of an optical fiber bundle formed by bundling a plurality of optical fibers, the method comprising:
feeding the optical fiber bundle in a feeding direction from a fiber passage member;
feeding the bundling members while forming intersection points between two of the bundling members on the outer circumference of the optical fiber bundle by
feeding at least one of the bundling members from a bundling member passage part of a rotating member that is arranged to an outer circumference of the fiber passage member, while
causing the rotating member to oscillate, with the feeding direction serving as an axis; and
fusion-bonding the bundling members at their intersection points by passing the optical fiber bundle and the bundling members through a heating unit that is arranged downstream from the fiber passage member and the rotating member in the feeding direction, and thus forming an optical fiber unit in which the winding direction, with respect to the optical fiber bundle, of said at least one of the bundling members is reversed at a fusion-bonded point between the bundling members, and wherein:
the rotating member includes
a first rotating member that is arranged to the outer circumference of the fiber passage member, and
a second rotating member that is arranged to an outer circumference of the first rotating member; and
the first rotating member and the second rotating member oscillate while rotating in opposite directions from one another.

2. The method for producing an optical fiber unit according to claim 1, wherein:
the first rotating member and the second rotating member are each constituted by a circular-cylindrical member;
the first rotating member projects more toward the upstream side in the feeding direction than the second rotating member; and
the first rotating member is rotated by driving a section, of the first rotating member, that projects more toward the upstream side in the feeding direction than the second rotating member.

3. The method for producing an optical fiber unit according to claim 1, wherein the heating unit includes
a tapered part whose inner diameter decreases toward the downstream side in the feeding direction, and
a straight part provided downstream from the tapered part in the feeding direction.

4. The method for producing an optical fiber unit according to claim 3, wherein a cooling part is provided downstream from the straight part in the feeding direction.

5. The method for producing an optical fiber unit according to claim 1, wherein the rotating member oscillates, with the feeding direction serving as the axis, at an angle that is greater than a winding angle at which said bundling member is wound with respect to the optical fiber bundle in the optical fiber unit to be produced.

* * * * *